UNITED STATES PATENT OFFICE.

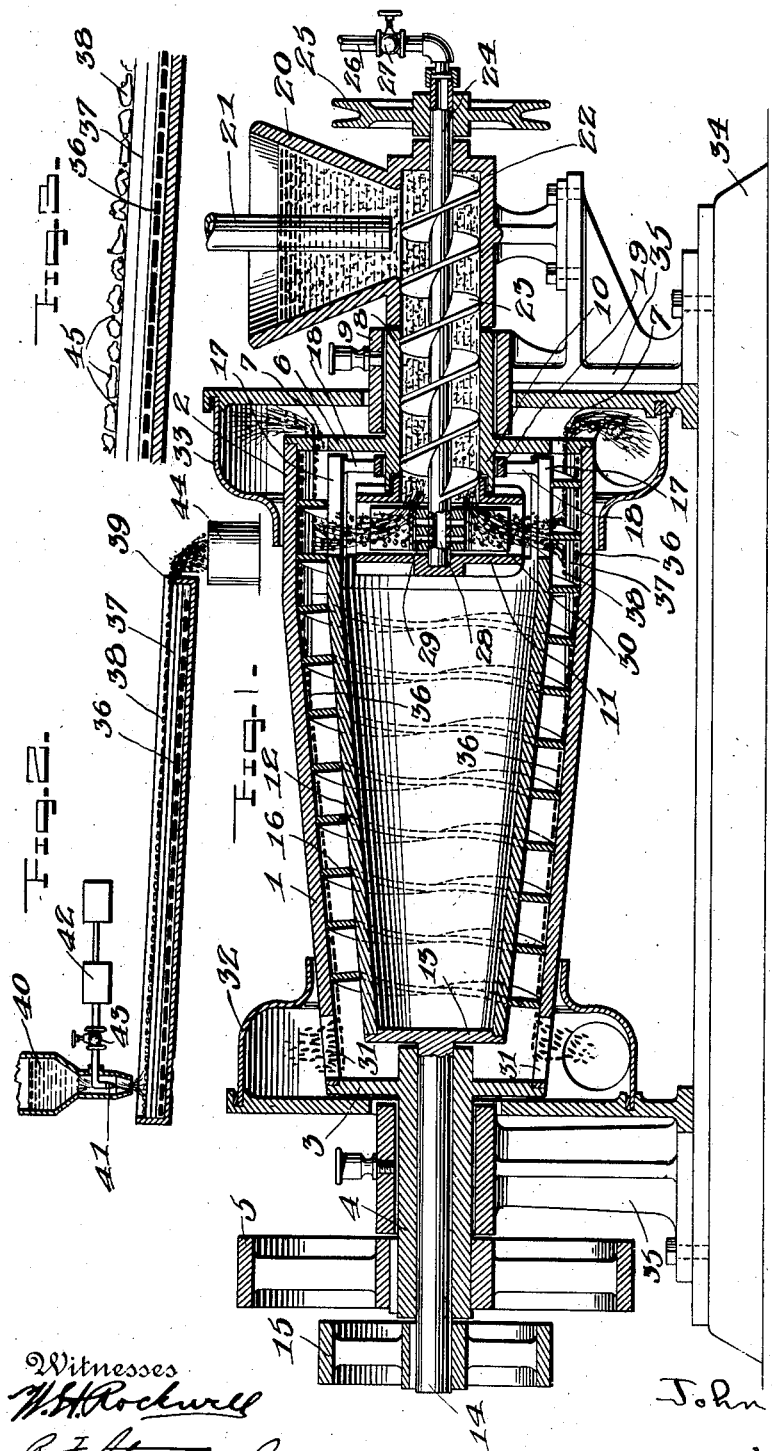

JOHN J. BERRIGAN, OF ORANGE, NEW JERSEY.

PROCESS OF PRODUCING STARCH.

994,497.  Specification of Letters Patent.  Patented June 6, 1911.

Application filed March 30, 1910. Serial No. 552,323.

*To all whom it may concern:*

Be it known that I, JOHN J. BERRIGAN, a citizen of the United States, residing at Orange, in the county of Essex and State of New Jersey, have invented certain new and useful Improvements in Processes of Producing Starch, of which the following is a specification.

This invention relates to processes of producing starch; and it embraces a method of producing starch from grain and similar farinaceous materials wherein the grain is ground wet in the usual manner to make starch milk, this milk is aerated to facilitate separation of the components and is thereafter separated into layers of starch, liquid and floating impurities; all as more fully hereinafter set forth and as claimed.

In the art of starch manufacture, the grain or other farinaceous raw material is ordinarily steeped in an aqueous liquid, such as weak sulfurous acid, sulfite solutions, etc., ground wet and strained or screened. The coarser parts, such as hulls and the like, remain on the screens while a liquid or liquor, called starch milk in the art, strains through. This starch milk, for the present purposes, consists of starch granules and other finely divided matter from the grain suspended in a liquid which is an aqueous solution of the soluble matters of the grain and of the chemicals used in the steeping operation. In addition there are more or less sand and dirt and oil or fat present. The non-starchy matters in the art are called "gluten" and consist of a wide variety of different constituents of the grain from albuminoid bodies, such as the chemical substance gluten, to husky and chaffy particles, some being heavy and dense, some being lighter, some of a more or less slimy or flocky flocculent nature, etc.

All the methods of separating starch from the other constituents of starch milk depend on the relatively high specific gravity of starch which is, in the case of the fully matured starch granule, about 1.50. In the usual practice, the starch milk is run down inclined tables where the different substances separate in the order of their specific gravity. The separated starch is then remixed with water and the operation repeated. In less used methods, the starch is separated from the milk in centrifugal machines. The ordinary methods are however slow and more tedious and expensive than they should be owing to the imperfect nature of the separation which can be effected in a single operation. As stated, the gluten is composed of a number of substances, some of which are heavy and some of which are light. On the other hand, the starch as it occurs in nature is not always of the same specific gravity, immature grains being more or less hydrated and of relatively less specific gravity. Nor are the granules all of the same size, so that in sizing or levigating actions, (and starch separation in principle is a levigating action) they do not separate alike. In practice in the preliminary separation therefore a relatively pure starch is never obtained and on the other hand the "gluten" invariably carries more or less starch with it.

I have discovered that by a simple expedient I can artificially increase the difference in specific gravity of the components of the starch milk and cause the "gluten" to float, this expedient being aerating the liquid. On aerating starch milk, and particularly that made from corn or maize, the air bubbles have a much greater tendency to cling to the gluten particles than to the starch particles, so that by a proper control of conditions with a regulated aeration of the liquid the former can be caused to float, being buoyed up by the bubbles. Any gas may be used in lieu of air, but air is satisfactory and convenient. In the operation, care must be of course taken to control the aeration since the admission of too much air may tend to buoy up the starch while too little will allow some of the gluten to sink.

The process may be applied in any of a wide variety of ways. For example, the starch milk may be treated with air or other gas under pressure, the pressure released and the liquid transferred to a starch table or a centrifugal for separation. Under the pressure, the air will dissolve to some extent in the liquid while upon release of pressure, it will be reëvolved in the gaseous form as minute bubbles clinging to the gluten particles, which exercise the well-known "nucleous action" in promoting the separation of dissolved solutes. This separation, being a nucleus action, is preferential and the separation is upon the gluten particles in preference to the starch particles. Or, the starch milk may be fed to the separating device, such as the starch table or a starch centrifugal, through an aerating device, such as a pipe connection provided with means for introducing air and having an aerating nozzle or device. In operating a centrifugal having a rotating tubular feed element, if this element be belled or radially directed at any point the suction due to centrifugal force may make the liquid to enter the machine with considerable violence and by proper designing of the apparatus elements, air may be caused to accompany it in suitable amounts and in a state of suitable distribution, without the use of special air-forcing means.

As stated, the amount of air admixed with the starch milk must be controlled; and its distribution in the milk must be also controlled. For the present purposes, it is mainly the minute bubbles which are of importance since larger bubbles do not adhere well to the gluten and break too readily. A minute bubble is tolerably permanent in the liquor which is the suspending medium in starch milk and acts as a buoying element for some time, the time being generally the less the greater the magnitude of the bubble. And as the gluten particles are small and no great flotative power is requisite to secure a good separation, the bubbles should also be small for this reason. Such small bubbles are secured, as well as a good utilization of the preferential nucleus action, where air is released from a solution made under pressure. In introducing air with starch milk through a nozzle or other distributing element, some solution of the air is secured and the remainder of the air, with properly designed apparatus, is well divided and distributed.

The particular design or type of the apparatus used in securing the aeration of the starch milk as well as of the apparatus employed in securing the separation of the buoyed gluten from the starch are of subordinate importance. As stated however, the means for aeration are preferably such as will secure the introduction of a regulated amount of air and cause its thorough and minute distribution through the starch milk, either as evolving bubbles or as subdivided air, or both. In the separation, the means employed should be such as will effect a substantial separation of the starch and gluten prior to the dissipation of the buoying bubbles and for this reason it may well be some type of suitable centrifugal or a specially designed starch table, having, for example, a steeper slope than is usual.

Centrifugal machines have hitherto proved not well adapted for starch separation since they effect a graded separation of the heavier components of the gluten as well as of the parts of the starch of different specific gravity. In an ordinary vertical imperforate bowl, starch milk when fed in may, for example, give next the bowl wall a layer of starch containing veinings and stratifications of heavy gluten, then successive layers of gluten and starch in various states of impurity and finally an inner layer or wall of water and the flocky and slimy constituents of gluten. With the present method, on the other hand, with proper means for introduction and withdrawal, the fractionation may be into three layers, one of starch and one of floating gluten with an intervening layer of liquor; and from these three layers the several substances may be constantly and automatically withdrawn by suitable mechanical means. But the apparatus chosen should be one which permits the withdrawal of the gluten prior to the dissipation of the buoying air bubbles. A long horizontal machine having means for working the materials of the different zones in different directions and effecting an initial separation prior to dissipation of the buoying air bodies is a suitable apparatus; but other types may be employed. The important thing in the present process is to produce the differential flotation so as to cause the gluten to float and then to effect a separation before the aerative effect has disappeared, and obviously many mechanical means may be devised for carrying it into effect.

In one typical embodiment of the present process I may rotate a drum or cylinder on its axis in either a horizontal or a vertical position and introduce aerated starch milk. This may be done by connecting the feed pipe with a source of air under pressure in such a manner as to produce a good intermingling of gas and fluid prior to ejecting into the bowl, the connection being made in such a manner as to give a regulable control of the relative proportions of the two. Or the feed pipe may be made a rotative part of the centrifugal and provided with a slight enlargement at the point of discharge or it may be directed radially outward at one point as at the inner end to cause a suction and introduce air with the milk. In so doing however, since the centrifugal action is a powerful one, means must be provided to control the amount of air so entering. The centrifugal machine should be provided with means for removing the starch from the point of introduction of the starch milk to a point beyond so that it may not be contaminated with gluten allowed to sink by the dissipation of adhering air, and similarly the floated gluten should be quickly removed to a point where it cannot contaminate the starch by settling. And the action in the centrifugal should not be prolonged as regards the initial separation of any individual portion of freshly introduced starch milk.

A suitable apparatus for the present purpose is a cylindrical or coned horizontal cylinder having a wall or inner surface inclined from the inner circumference toward the center and with means near the inner circumference for continuously removing liquid and floated gluten as fast as separated from the starch. The starch separated by centrifugal action may be removed over the inclined surface toward the center by suitable conveyer mechanism, the liquor and the floated gluten draining back toward the circumference and the outlet. A simple cylinder may be employed if it be provided with proper conveyer means to cause the starch wall to build up into a hollow cone having a surface inclined toward the center and extending out of the liquor and gluten annuli. Such an apparatus may be provided with a starch milk inlet leading to a midpoint and carrying a tube rotating with the cylinder. Upon rotation such a tube positively impels the starch milk inward and by suitable construction a sufficient amount of air may be simultaneously introduced in a suitable manner, as by providing the tube with a valved air-inlet and precluding other introduction of air. The only advantage of centrifugal action in the present process however is as permitting a quicker separation; as permitting the quick separation of gluten and starch prior to the dissipation of the effects of aeration, centrifugal force being more powerful than gravitation and hence giving a quicker separation. Where gravity alone is employed as the separating agent, more efficient aerating means must be employed and, furthermore, since the difference in density is greater in aerated starch milk than in non-aerated, the ordinary starch table may be modified to give a quicker separation by making its slant steeper.

The important point in the present method is that of producing an artificial differentiation in specific gravity between the solid components of starch milk and then making a rapid separation before this differentiation disappears.

While the present method may be employed with any of the grains or with other farinaceous materials such as potatoes, I regard it as particularly adapted for making corn starch since the presence of the oil in corn appears to make the components of the starch milk particularly susceptible to the described artificial differentiation in specific gravity between the starch and the gluten.

After the separation of the floated gluten, it may be collected on the tables or in a centrifugal in the ordinary manner as the buoying air bubbles dissipate. Or with specially designed centrifugals it may be collected in one part of the machine while the starch is collected in another, the initial floating and separation of the two having taken place at a midpoint.

The starch separated from the floated gluten may be collected and refined in the usual manner; and the floating operation may be repeated upon the starch as often as may be desired. Since the separation of starch and buoyed gluten is in a way a positive action, the operator is not restricted either to starch tables or centrifugal but may use any type of apparatus adapted to separate settled solids and floating solids from a body of liquor, such as the many levigating machines. Or a simple tank may be used, starch being withdrawn from the bottom and floated gluten from a point above.

In the accompanying illustration I have shown, more or less diagrammatically, certain means capable of use in the described process.

In this showing, Figure 1 is a vertical section of one of the many types of centrifugal which may be employed; Fig. 2 is a diagrammatic representation of a starch table in vertical section; and Fig. 3 is a fragmentary view on a much enlarged scale, showing separation of floating gluten.

In the showing of Fig. 1, element 1 is a rotatable horizontal centrifugal drum having a coned portion and a cylindrical portion 2. At the smaller end of the drum it is closed by wall 3, rigid with sleeve 4, to which motion may be imparted by pulley wheel 5 or other appropriate means. At the other end of the centrifugal is wall 6 having perforations 7 at a suitable level. This wall is rigid with a feed sleeve 8 rotating in bearings 9, and having an extension 10 provided with a delivery device 11. Within this drum is another drum-like member 12, having an end wall 13 rigid with the shaft 14, mounted within the sleeve of the first drum and having pulley 15 or other device for imparting motion thereto. On its periphery the inner drum carries a helical screw conveyer 16 corresponding to and moving over the inner wall of the outer drum. This inner drum is provided with a skeleton extension 17 upon which the continuation of the screw conveyer is mounted. The skeleton extension is mounted on arms 18, rigid with collar 19.

The device is fed with starch milk from hopper 20 having a starch milk feeding device 21 extending therewithin. At its base the hopper communicates with a stationary cylindrical chamber 22, fitting closely against the feed sleeve. Within this cylindrical chamber and the feed sleeve rotates a screw conveyer 23 mounted on hollow shaft 24, and actuated by 25. At its end the hollow shaft seats in the delivery device (11). Seated within the end of the hollow shaft is an air pipe 26, valved at 27. At the other end of the hollow shaft is an air chamber 28, provided with air delivery orifices 29. This air chamber rotates with the hollow shaft, being rigid therewith, and carries sweep blades 30. At the smaller end of the drum are delivery orifices 31 delivering starch into stationary casing 32. At the other end of the drum is another stationary casing 33 for receiving water and floating gluten. The whole apparatus is mounted on the usual base 34, standards 35, etc. Within the drum is diagrammatically shown a layer 36 of separated starch, a layer 37 of water, and a layer 38 of floating gluten.

In the showing of Fig. 2, element 39 is a diagrammatically shown starch table fed with starch milk from 40. This starch milk is aerated by nozzle 41 fed with air or gas by pump 42, the supply being controlled by valve 43. The floating gluten and water is received from the starch table in vessel 44.

The showing in Fig. 3 represents a section on an exaggerated scale of the showing in Figs. 1 and 2, and represents the starch layer, the water layer, and the layer of floating gluten buoyed up by bubbles indicated as 45. The operation of this structure is evident. The starch milk fed by 21 into hopper 20 which serves as an equalizing device, is fed forward by screw 23 into delivery device (11), whence it is centrifugally thrown outward against the wall of the outer drum, there separating into water, starch and gluten. Air fed in through 26, the supply being controlled by 27, passes through 29 into the starch milk and aerates it. Sweeps 30 prevent any accumulation against the wall of the delivery device. The aerated starch milk thrown against the wall of the outer drum is separated into three layers and the helical screw feeds the starch backward out of the water and up over the coned dry wall of the outer drum until it reaches orifice 31, when it is centrifugally expelled. The aerated gluten and the water flows out through orifice (7).

The operation of Fig. 2 is obvious. Starch milk fed down through 40 receives air from 41 and is delivered upon the starch table where the starch sinks to the bottom and the gluten floats above the water. In the progress of the material down the starch table, the separated starch is taken off at the side by means (not shown) while the water and gluten pass forward and flow into 44.

What I claim is:—

1. The process of making starch which comprises producing a starch milk, aerating the milk to cause flotation of the gluten and causing a separation of starch from the liquid during such flotation.

2. The process of making starch which comprises producing starch milk, aerating the starch milk to cause flotation of the gluten and centrifugally separating the starch from the liquid during the flotation.

3. The process of making starch which comprises producing starch milk, impregnating it with finely divided air in sufficient amount to cause a buoying up and flotation of the gluten and separating the liquid from the dense starch.

4. The process of making corn starch which comprises producing a starch milk from corn, impregnating the milk with finely divided air in amount sufficient to cause a flotation of the gluten and separating the starch from the liquor during such flotation.

5. The process of making starch which comprises producing a starch milk from corn, introducing it into a centrifugal in such manner as to produce a simultaneous aeration with controlled amounts of air and separating the starch from the liquid and the buoyed gluten in the centrifugal.

6. The process of making starch which comprises producing a starch milk from corn, introducing it into a rotating cylinder having a dry wall together with merely sufficient air to produce a flotation of the gluten, separating the floating gluten with the liquid from the starch and working the separated starch up over the dry wall.

7. In the manufacture of starch, the process which comprises aerating starch milk with finely divided air in quantity sufficient to float the gluten and thereafter separating the liquid into a layer of starch and a layer of buoyed gluten spaced apart by an intervening layer of liquid.

In testimony whereof, I affix my signature in the presence of witnesses.

JOHN J. BERRIGAN.

Witnesses:
JOHN S. PAUL,
W. C. TERLUME.